US012676741B2

(12) United States Patent
Kiyomura et al.

(10) Patent No.:  US 12,676,741 B2
(45) Date of Patent:  Jul. 7, 2026

(54) KEY EXCHANGE SYSTEM, HUB APPARATUS, QKD APPARATUS, METHOD, AND PROGRAM

(71) Applicant: NTT, Inc., Tokyo (JP)

(72) Inventors: Yutaro Kiyomura, Tokyo (JP); Sakae Chikara, Tokyo (JP); Tetsutaro Kobayashi, Tokyo (JP); Koji Chida, Tokyo (JP); Katsuyuki Natsukawa, Tokyo (JP); Atsushi Taniguchi, Tokyo (JP); Daisuke Shirai, Tokyo (JP); Koichi Takasugi, Tokyo (JP)

(73) Assignee: NTT, Inc., Tokyo (JP)

( * ) Notice: Subject to any disclaimer, the term of this patent is extended or adjusted under 35 U.S.C. 154(b) by 12 days.

(21) Appl. No.: 18/860,876

(22) PCT Filed: May 11, 2022

(86) PCT No.: PCT/JP2022/019988
§ 371 (c)(1),
(2) Date: Oct. 28, 2024

(87) PCT Pub. No.: WO2023/218575
PCT Pub. Date: Nov. 16, 2023

(65) Prior Publication Data
US 2025/0300819 A1      Sep. 25, 2025

(51) Int. Cl.
*H04L 9/08*          (2006.01)

(52) U.S. Cl.
CPC ........... *H04L 9/0855* (2013.01); *H04L 9/085* (2013.01); *H04L 9/0858* (2013.01); *H04L 9/0869* (2013.01)

(58) Field of Classification Search
None
See application file for complete search history.

(56) References Cited

U.S. PATENT DOCUMENTS

2006/0212936 A1    9/2006  Berzanskis et al.
2007/0140495 A1    6/2007  Berzanskis et al.
(Continued)

FOREIGN PATENT DOCUMENTS

GB          2608353 A  *  1/2023  .......... H04L 9/0869
JP      2007-511956          5/2007
(Continued)

OTHER PUBLICATIONS

Efficient reconciliation protocol for discrete-variable quantum key distribution ISIT 2009 (Year: 2009).*
(Continued)

*Primary Examiner* — Fatoumata Traore
(74) *Attorney, Agent, or Firm* — IPUSA, PLLC

(57)          ABSTRACT

A key exchange system according to an aspect of the present disclosure includes: a plurality of quantum key distribution (QKD) apparatuses that executes a quantum key distribution protocol including at least error correction; and a plurality of hub apparatuses that performs encrypted communication with each other, in which each of the hub apparatuses includes a key generation unit configured to generate an encryption key for performing the encrypted communication with another hub apparatus based on information received from a corresponding one of the QKD apparatuses, and each of the QKD apparatuses includes a QKD processing unit configured to execute the quantum key distribution protocol with another QKD apparatus and generate a correction key from a ciphertext of random number information, and a first transmission unit configured to transmit information representing a result of basis reconciliation in the quantum key distribution protocol to a corresponding one of the hub apparatuses.

7 Claims, 7 Drawing Sheets

(56) References Cited

U.S. PATENT DOCUMENTS

| | | | |
|---|---|---|---|
| 2008/0147820 A1 | 6/2008 | Maeda et al. | |
| 2012/0314867 A1* | 12/2012 | Tomaru ..................... | H04L 9/08 |
| | | | 380/270 |
| 2015/0036824 A1* | 2/2015 | Dixon ................... | H04L 9/0852 |
| | | | 380/279 |
| 2017/0264433 A1* | 9/2017 | Tanizawa .............. | H04L 9/0858 |
| 2017/0338952 A1* | 11/2017 | Hong ...................... | H04L 9/083 |
| 2020/0322141 A1 | 10/2020 | Kinjo et al. | |
| 2022/0209943 A1* | 6/2022 | Syrivelis ............... | G06N 10/00 |

FOREIGN PATENT DOCUMENTS

| | | |
|---|---|---|
| JP | 2008-154019 | 7/2008 |
| JP | 2008-533910 | 8/2008 |
| WO | 2019/107129 | 6/2019 |

OTHER PUBLICATIONS

A novel error correction protocol for continuous variable quantum key distribution (Year: 2021).*

C. H. Bennett, G. Brassard, "Quantum Cryptography: Public Key Distribution and Coin Tossing", Proceedings of IEEE International Conference on Computers Systems and Signal Processing, Bangalore India, pp. 175-179, Dec. 1984.

Braun Ralf-Peter et al: "The OpenQKD Testbed in Berlin",2021 Asia Communications and Photonics 1 Conference (ACP), OSA, Oct. 24, 2021 (Oct. 24, 2021), pp. 1-3, XP034105951.

\* cited by examiner

Figure 2:
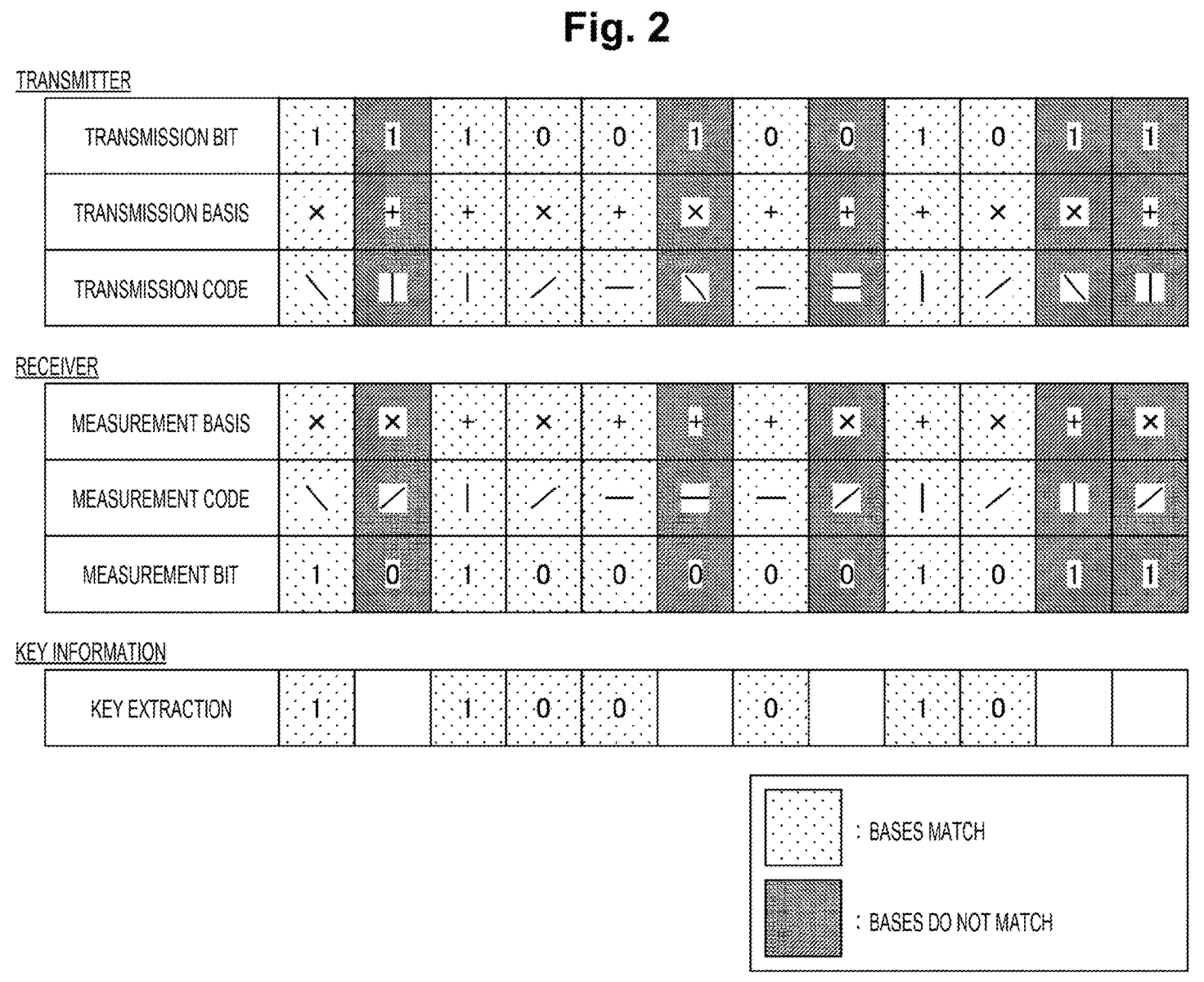

TRANSMITTER

| TRANSMISSION BIT | 1 | 1 | 0 | 0 | 1 | 0 | 0 | 1 | 0 | 1 | 1 |
| --- | --- | --- | --- | --- | --- | --- | --- | --- | --- | --- | --- |
| TRANSMISSION BASIS | + | × | + | × | + | + | × | + | × | × | + |
| TRANSMISSION CODE | — | / | \ | — | / | | | | — | \ | / |

RECEIVER

| MEASUREMENT BASIS | + | × | × | + | × | + | × | × | + | / | × |
| --- | --- | --- | --- | --- | --- | --- | --- | --- | --- | --- | --- |
| MEASUREMENT CODE | \ | / | \ | | | | | — | / | — | | | / |
| MEASUREMENT BIT | 0 | 1 | 0 | 0 | 0 | 0 | 0 | 1 | 0 | 1 | 1 |

KEY INFORMATION

| KEY EXTRACTION | 1 | | 0 | 0 | 0 | | 0 | 1 | 0 | | |
| --- | --- | --- | --- | --- | --- | --- | --- | --- | --- | --- | --- |

: BASES MATCH

: BASES DO NOT MATCH

Fig. 7

KEY EXCHANGE SYSTEM, HUB APPARATUS, QKD APPARATUS, METHOD, AND PROGRAM

TECHNICAL FIELD

The present disclosure relates to a key exchange system, a hub apparatus, a QKD apparatus, a method, and a program.

BACKGROUND ART

It is known that it becomes possible to solve a mathematical problem (a prime factorization problem or a discrete logarithm problem), that is a security basis of existing cipher, in a realistic time by practical application of a quantum computer. For this reason, there is a risk that an RSA cipher or an elliptic curve cipher that is an existing cipher may be compromised, and it is necessary to shift to encryption technology that cannot be decrypted even by a quantum computer.

As encryption technologies that cannot be decrypted by a quantum computer, there are post-quantum cryptography (PQC) and quantum key distribution (QKD). As a representative protocol of QKD, the BB84 scheme is known (for example, Non Patent Literature 1). The BB84 scheme is a scheme in which 1-bit key information is expressed by polarization or a phase of one photon and transmitted/shared.

CITATION LIST

Non Patent Literature

Non Patent Literature 1: C. H. Bennett, G. Brassard, "Quantum Cryptography: Public Key Distribution and Coin Tossing", Proceedings of IEEE International Conference on Computers Systems and Signal Processing, Bangalore India, pp 175-179, December 1984.

SUMMARY OF INVENTION

Technical Problem

However, in the conventional BB84 scheme, since a QKD apparatus that transmits and receives photons has key information, there is a problem that security cannot be guaranteed in a case where the QKD apparatus is unreliable.

The present disclosure has been made in view of the above points, and an object thereof is to provide a technology capable of performing secure key exchange by a QKD protocol.

Solution to Problem

A key exchange system according to an aspect of the present disclosure includes: a plurality of quantum key distribution (QKD) apparatuses that executes a quantum key distribution protocol including at least error correction; and a plurality of hub apparatuses that performs encrypted communication with each other, in which each of the hub apparatuses includes a key generation unit configured to generate an encryption key for performing the encrypted communication with another hub apparatus based on information received from a corresponding one of the QKD apparatuses, and each of the QKD apparatuses includes a QKD processing unit configured to execute the quantum key distribution protocol with another QKD apparatus and generate a correction key from a ciphertext of random number information, and a first transmission unit configured to transmit information representing a result of basis reconciliation in the quantum key distribution protocol to a corresponding one of the hub apparatuses.

Advantageous Effects of Invention

A technology capable of performing secure key exchange by using a QKD protocol is provided.

BRIEF DESCRIPTION OF DRAWINGS

FIG. 1 is a diagram illustrating an example of a QKD protocol.

FIG. 2 is a diagram illustrating an example of key extraction.

FIG. 7 is a diagram illustrating an example of a hardware configuration of a computer.

DESCRIPTION OF EMBODIMENTS

Figure 3:
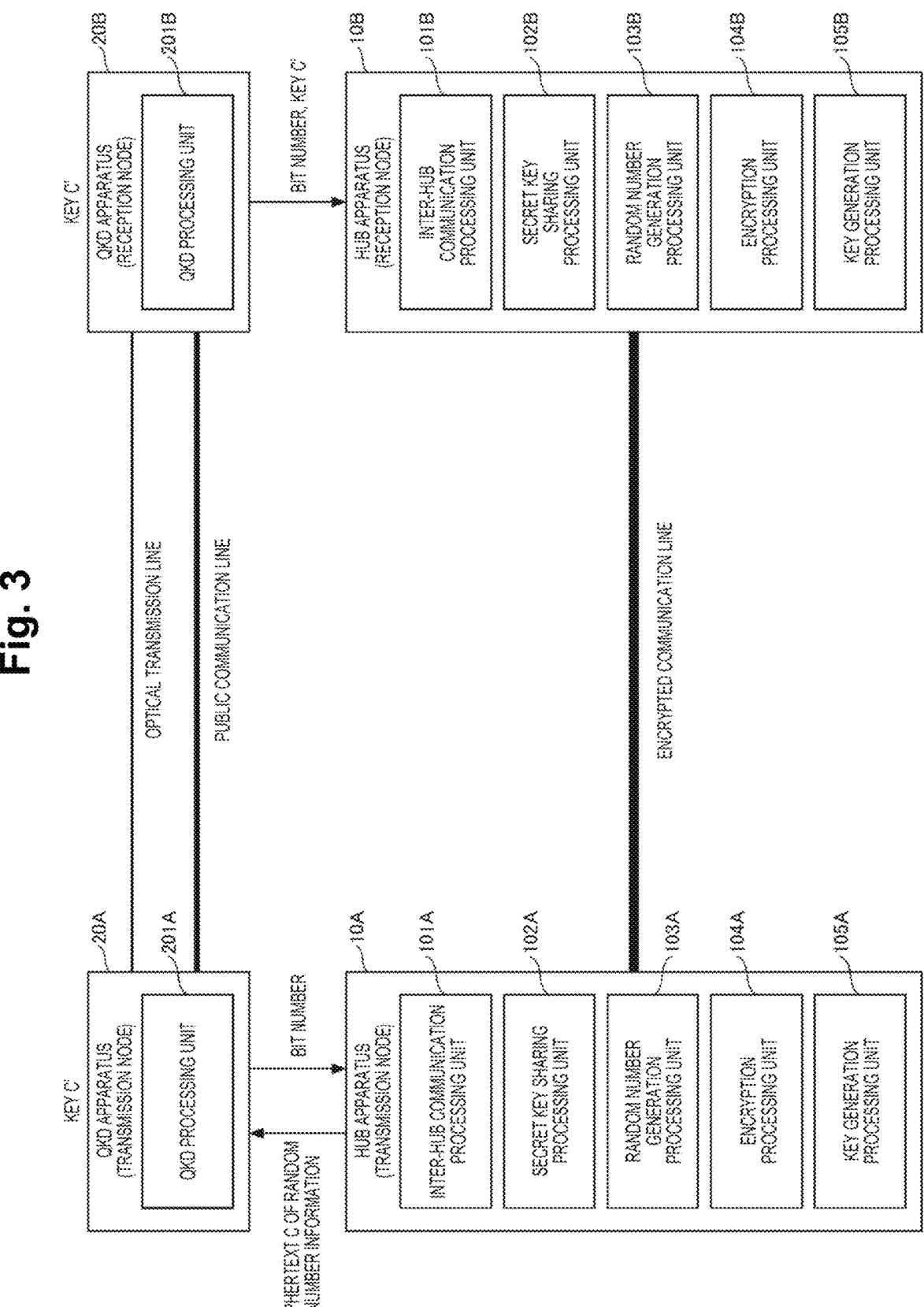
FIG. 3 is a diagram illustrating an example of an overall configuration of a key exchange system according to a present embodiment.

Hereinafter, one embodiment of the present invention will be described.
<Key Exchange by Using QKD Protocol>
Hereinafter, with reference to FIG. 1, a case will be described where the BB84 scheme that encodes a bit (0 or 1) into polarization is assumed as an example of a QKD protocol and key exchange is performed by using the QKD protocol. Note that, for details of the BB84 scheme, refer to, for example, Non Patent Literature 1 described above.

Figure 1:
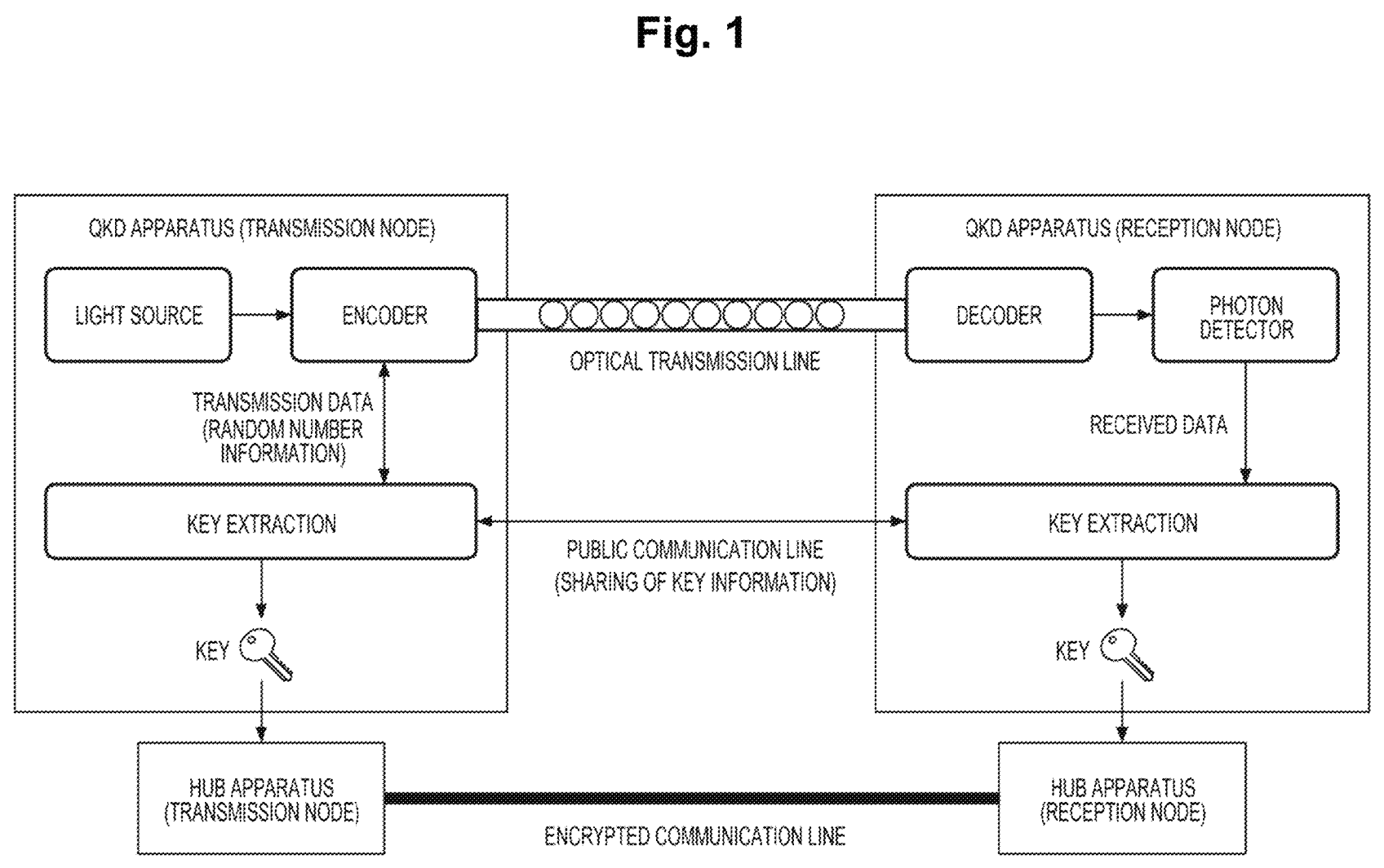

In FIG. 1, a case is assumed where encrypted communication is performed between a hub apparatus (transmission node) existing in a hub on a data transmission side and a hub apparatus (reception node) existing in a hub on a data reception side. At this time, it is assumed that there is a QKD apparatus (transmission node) in the hub on the data transmission side, and there is a QKD apparatus (reception node) in the hub on the data reception side. A key (encryption key) used for the encrypted communication between the hub apparatus (transmission node) and the hub apparatus (reception node) is generated and shared by execution of the QKD protocol between the QKD apparatus (transmission node) and the QKD apparatus (reception node).

In the BB84 scheme, the key is generated and shared by Procedure 1 to Procedure 7 below. In the following description of the BB84 scheme, the QKD apparatus (transmission node) is referred to as a "transmitter", and the QKD apparatus (reception node) is referred to as a "receiver".

Procedure 1: The transmitter generates random number information (a random bit string having a predetermined length).

Procedure 2: The transmitter randomly selects a basis from two bases (+ basis and × basis), and encodes each bit of the bit string into polarization of a photon according to the basis. At this time, the transmitter encodes bits into polarization of photons according to Table 1 below.

TABLE 1

| Bit | 0 | 1 |
| --- | --- | --- |
| +Basis (Horizontal - Vertical Basis) | — | │ |
| ×Basis (45°-135° Basis) | / | \ |

That is, when the + basis is selected, 0 is encoded as horizontal polarization and 1 is encoded as vertically polarization. On the other hand, when the × basis is selected, 0 is encoded as 45° polarization and 1 is encoded as 135° polarization. Note that the photons are output from a light source.

Procedure 3: The transmitter transmits a photon train to the receiver through an optical transmission line.

Procedure 4: The receiver randomly selects a basis from two bases (+ basis and × basis), and measures each of photons (that is, decodes each of the photons with the selected basis, and determines bit values according to whether or not the photons are detected by a photon detector).

Procedure 5: The receiver notifies the transmitter via a public communication line which basis was used to measure each of the photons.

Procedure 6: The transmitter notifies the receiver of a portion of the bit string in which a basis selected by the transmitter matches a basis notified by the receiver (for example, a position of the bit string at which those bases match each other) through the public communication line. Procedure 5 and Procedure 6 described above are also referred to as basis reconciliation.

Procedure 7: The transmitter and the receiver extract a bit string in which bases selected by the transmitter and the receiver match each other, and generate an encryption key (key information) based on the extracted bit string. For example, as illustrated in FIG. 2, in a case where bases selected by the transmitter and the receiver match in the 1st, 5th, 7th, 10th, and 11th bits with a leading bit as the 0th bit, a bit string "1100010" is extracted, and an encryption key (key information) is generated based on the bit string. Note that this bit string is also referred to as a sifted key. In general, after a sifted key is obtained, a part of the sifted key is extracted as a test bit, and presence or absence of eavesdropping is evaluated from a bit error rate, and then, in a case where it is evaluated that there is no eavesdropping, error correction and privacy amplification processing are executed to generate an encryption key (key information).

As a result, the encryption key used for the encrypted communication is shared between the QKD apparatus (transmission node) and the QKD apparatus (reception node), and the hub apparatus (transmission node) and the hub apparatus (reception node) can perform the encrypted communication by using the encryption key.

As described above, in the conventional QKD protocol such as the BB84 scheme, the QKD apparatuses have the key information. For this reason, in a case where a QKD apparatus is unreliable, there is a problem that security cannot be guaranteed, and thus, in the following, a key exchange method capable of concealing the key information from the QKD apparatus is proposed. Note that the unreliable QKD apparatus is, for example, a QKD apparatus having a possibility of leakage or the like of key information.

<Proposed Method>

In the proposed method, to conceal key information from a QKD apparatus, a secret key sk is generated in a hub apparatus, and random number information encrypted by using the secret key sk is used when key information is generated in the QKD apparatus. On the other hand, the hub apparatus that has received the key information from the QKD apparatus obtains an encryption key, to be used for encrypted communication, by performing decryption by using the secret key sk. As a result, the key information can be concealed from the QKD apparatus.

Hereinafter, a key exchange system that shares QKD key information by the above proposed method will be described.

<Overall Configuration of Key Exchange System>

An example of an overall configuration of the key exchange system according to the present embodiment will be described with reference to FIG. 3.

As illustrated in FIG. 3, the key exchange system according to the present embodiment includes a plurality of hub apparatuses 10 and a plurality of QKD apparatuses 20. Hereinafter, a hub apparatus 10 existing in a hub on the data transmission side is referred to as a "hub apparatus 10A", and a hub apparatus 10 existing in a hub on the data reception side is referred to as a "hub apparatus 10B". Similarly, a QKD apparatus 20 existing in the hub on the data transmission side is referred to as a "QKD apparatus 20A", and a QKD apparatus 20 existing in the hub on the data reception side is referred to as a "QKD apparatus 20B". Note that the hub apparatuses 10 and the QKD apparatuses 20 are communicably connected by a public communication line, and the QKD apparatuses 20 are connected by an optical transmission line.

A hub apparatus 10 is an information processing apparatus (computer) that performs encrypted communication with a hub apparatus 10 existing in another hub. The hub apparatus 10 includes an inter-hub communication processing unit 101, a secret key sharing processing unit 102, a random number generation processing unit 103, an encryption processing unit 104, and a key generation processing unit 105. These units are implemented, for example, by processing that one or more programs installed in the hub apparatus 10 cause a processor such as a central processing unit (CPU) to execute.

The inter-hub communication processing unit 101 executes encrypted communication with the hub apparatus 10 existing in the other hub, various types of processing for performing the encrypted communication, and the like. The secret key sharing processing unit 102 executes processing for generating and sharing a secret key sk (secret key of a stream encryption scheme) with the hub apparatus 10 existing in the other hub. The random number generation processing unit 103 generates random number information r that is a random bit string having a predetermined length. The encryption processing unit 104 generates a ciphertext C by encrypting the random number information r by using the secret key sk. The key generation processing unit 105 uses information (bit numbers of a sifted key, or the bit numbers and a correction key C' to be described later) received from a corresponding QKD apparatus 20 to generate an encryption key D to be used for the encrypted communication with the hub apparatus 10 existing in the other hub. Hereinafter, data x encrypted by using the secret key sk is also represented as Enc(x; sk), and data obtained by decrypting data x' by using the secret key sk is also represented as Dec(x'; sk). In addition, hereinafter, the inter-hub communication processing unit 101, the secret key sharing processing unit 102, the random number generation processing unit 103, the encryption processing unit 104, and the key generation processing unit 105 included in the hub apparatus 10A are referred to as an "inter-hub communication processing unit 101A", a "secret key sharing processing unit 102A", a "random number generation processing unit 103A", an "encryption processing unit 104A", and a "key generation processing unit 105A", respectively. Similarly, the inter-hub communication processing unit 101, the secret key sharing processing unit 102, the random number generation processing unit 103, the encryption processing unit 104, and the key generation processing unit 105 included in the hub apparatus 10B are referred to as an "inter-hub communication processing unit 101B", a "secret key sharing processing unit 102B", a "random number generation processing unit 103B", an "encryption processing unit 104B", and a "key generation processing unit 105B", respectively. Note that the hub apparatus 10B does not necessarily include at least one of the random number generation processing unit 103B or the encryption processing unit 104B.

A QKD apparatus 20 is an information processing apparatus (computer) that executes a QKD protocol (for example, the BB84 scheme or the like) with a QKD apparatus 20 existing in another hub via an optical transmission line. The QKD apparatus 20 includes a QKD processing unit 201. The QKD processing unit 201 is implemented, for example, by processing that one or more programs installed in the QKD apparatus 20 cause a processor such as a CPU to execute. The QKD processing unit 201 executes the QKD protocol (including error correction and the like) with the QKD apparatus 20 existing in the other hub via the optical transmission line, and generates and shares a correction key C' that is a key after error correction. Hereinafter, the QKD processing unit 201 included in the QKD apparatus 20A is referred to as a "QKD processing unit 201A", and the QKD processing unit 201 included in the QKD apparatus 20B is referred to as a "QKD processing unit 201B".

<Processing Executed by Key Exchange System>

Figure 4:
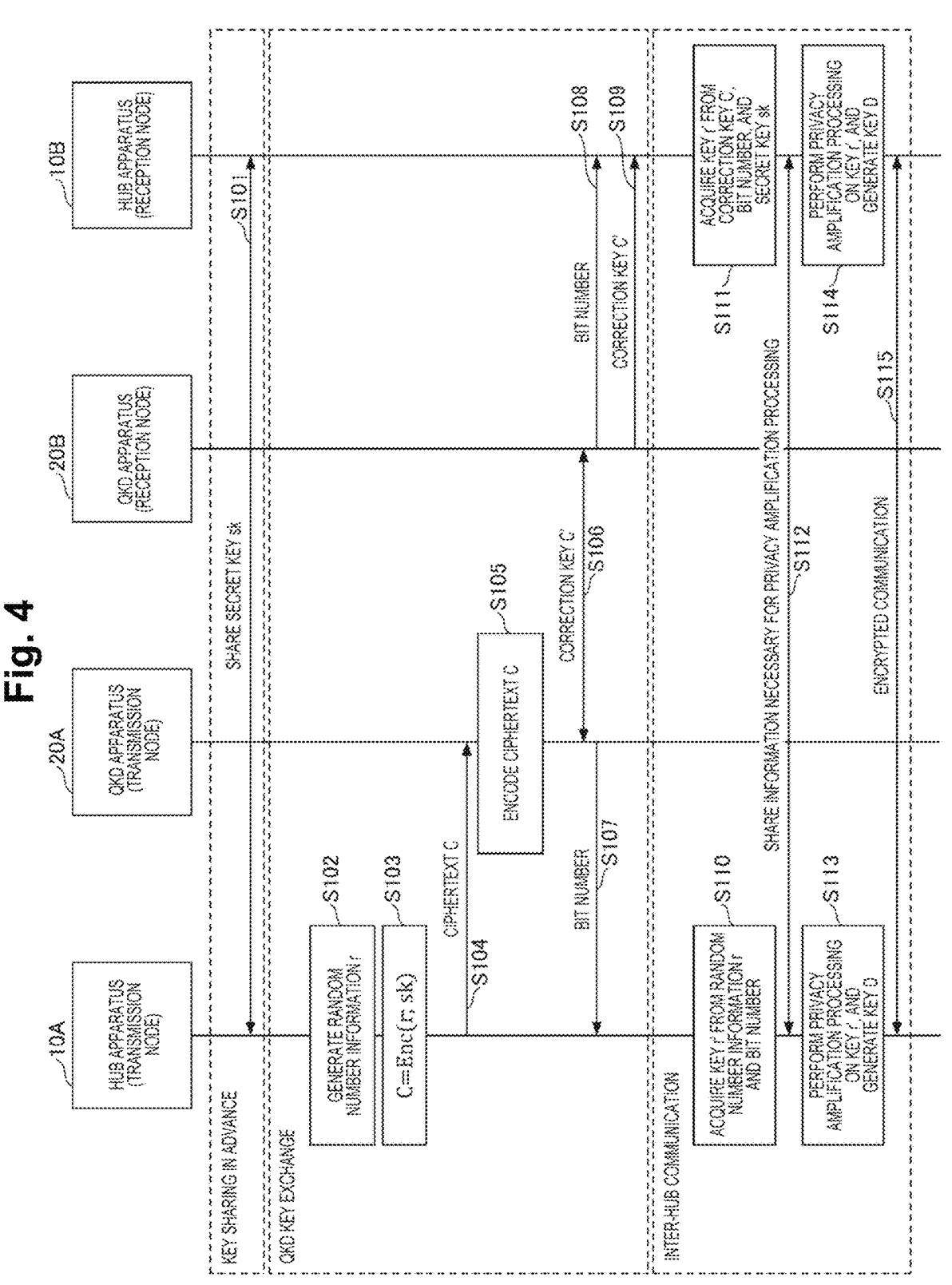
FIG. 4 is a sequence diagram illustrating an example of processing executed by the key exchange system according to the present embodiment.

An example of processing executed by the key exchange system according to the present embodiment will be described with reference to FIG. 4. Note that the processing executed by the key exchange system according to the present embodiment is roughly divided into key sharing in advance (steps S101), QKD key exchange (steps S102 to S109), and inter-hub communication (steps S110 to S115).

The secret key sharing processing unit 102A of the hub apparatus 10A and the secret key sharing processing unit 102B of the hub apparatus 10B generate and share a secret key sk of the stream encryption scheme (step S101).

The random number generation processing unit 103A of the hub apparatus 10A generates random number information r that is a random bit string having a predetermined length (step S102).

The encryption processing unit 104A of the hub apparatus 10A encrypts the random number information r by using the secret key sk to generate a ciphertext C, that is, C=Enc(r; sk) (step S103). Note that sk is the secret key of the stream encryption scheme, and thus the ciphertext C=Enc(r; sk) is specifically obtained by taking an exclusive OR of r and sk.

The inter-hub communication processing unit 101A of the hub apparatus 10A transmits the ciphertext C to the QKD apparatus 20A (step S104).

The QKD processing unit 201A of the QKD apparatus 20A encodes the ciphertext C (for example, sets a coding rate according to a previous error rate (bit error rate) and then performs encoding) (step S105), and executes the QKD protocol (including error correction and the like) with the QKD processing unit 201B of the QKD apparatus 20B to generate and share a correction key C' (step S106). Note that, regarding encoding, similarly to the existing BB84 scheme or the like, it is sufficient to encode each bit of a bit string representing the ciphertext C into polarization (or phase) of a photon. In addition, similarly to the existing BB84 scheme or the like, the QKD processing unit 201A of the QKD apparatus 20A and the QKD processing unit 201B of the QKD apparatus 20B only need to obtain a sifted key by basis reconciliation, then calculate the bit error rate and evaluate the presence or absence of eavesdropping, and in a case where it is evaluated that there is no eavesdropping, perform error correction to generate and share a correction key C'. However, for the error correction, a method capable of setting a coding rate (for example, a low density parity check (LDPC) code or the like) is used.

The QKD processing unit 201A of the QKD apparatus 20A transmits, to the hub apparatus 10A, the bit numbers of the sifted key (in other words, the bit numbers of a portion in which the selected bases match between the QKD apparatus 20A and the QKD apparatus 20B) obtained by the basis reconciliation in step S106 (step S107).

On the other hand, the QKD processing unit 201B of the QKD apparatus 20B transmits, to the hub apparatus 10B, the bit numbers of the sifted key obtained by the basis reconciliation in step S106 and the correction key C' obtained in step S106 (steps S108 and S109).

The key generation processing unit 105A of the hub apparatus 10A acquires a key r' by using the random number information r generated in step S102 and the bit numbers received from the QKD apparatus 20A (step S110). That is, the key generation processing unit 105A extracts a bit string of the bit numbers from a bit string representing the random number information r, and sets the extracted bit string as a key r'.

The key generation processing unit 105B of the hub apparatus 10B acquires the key r' by using the correction key C' and the bit numbers received from the QKD apparatus 20B and the secret key sk (step S111). That is, the key generation processing unit 105B decrypts the correction key C' by using the secret key sk (that is, Dec(C'; sk)), extracts a bit string of the bit numbers from a decrypted bit string (that is, a bit string representing Dec(C'; sk)), and sets the extracted bit string as the key r'. Note that sk is the secret key of the stream encryption scheme, and thus Dec(C'; sk) is specifically obtained by taking an exclusive OR of C' and sk.

The key generation processing unit 105A of the hub apparatus 10A and the key generation processing unit 105B of the hub apparatus 10B share information necessary for privacy amplification processing (step S112). Note that the privacy amplification processing is processing for improving confidentiality by sacrificing one bit, and is also referred to as key distillation together with error correction and the like. Since the privacy amplification processing is an existing technique, a detailed description thereof will be omitted.

The key generation processing unit 105A of the hub apparatus 10A performs privacy amplification processing on the key r' and generates an encryption key D (step S113). As a result, the hub apparatus 10A can obtain the encryption key D to be used for the encrypted communication.

Similarly, the key generation processing unit 105B of the hub apparatus 10B performs privacy amplification processing on the key r' to generate the encryption key D (step S114). As a result, the hub apparatus 10B can obtain the encryption key D to be used for the encrypted communication.

As described above, the inter-hub communication processing unit 101A of the hub apparatus 10A and the inter-hub communication processing unit 101B of the hub apparatus 10B can perform the encrypted communication by using the encryption key D (step S115).

Application Example

Hereinafter, as an application example of the present embodiment, a case will be described where there is a relay apparatus 30 between the QKD apparatuses 20. Note that, in the following, description of parts similar to those in the above embodiment will be omitted, and only differences from the above embodiment will be described.
Overall Configuration of Key Exchange System in Application Example An overall configuration of a key exchange system in the application example will be described with reference to FIG. 5.

Figure 5:
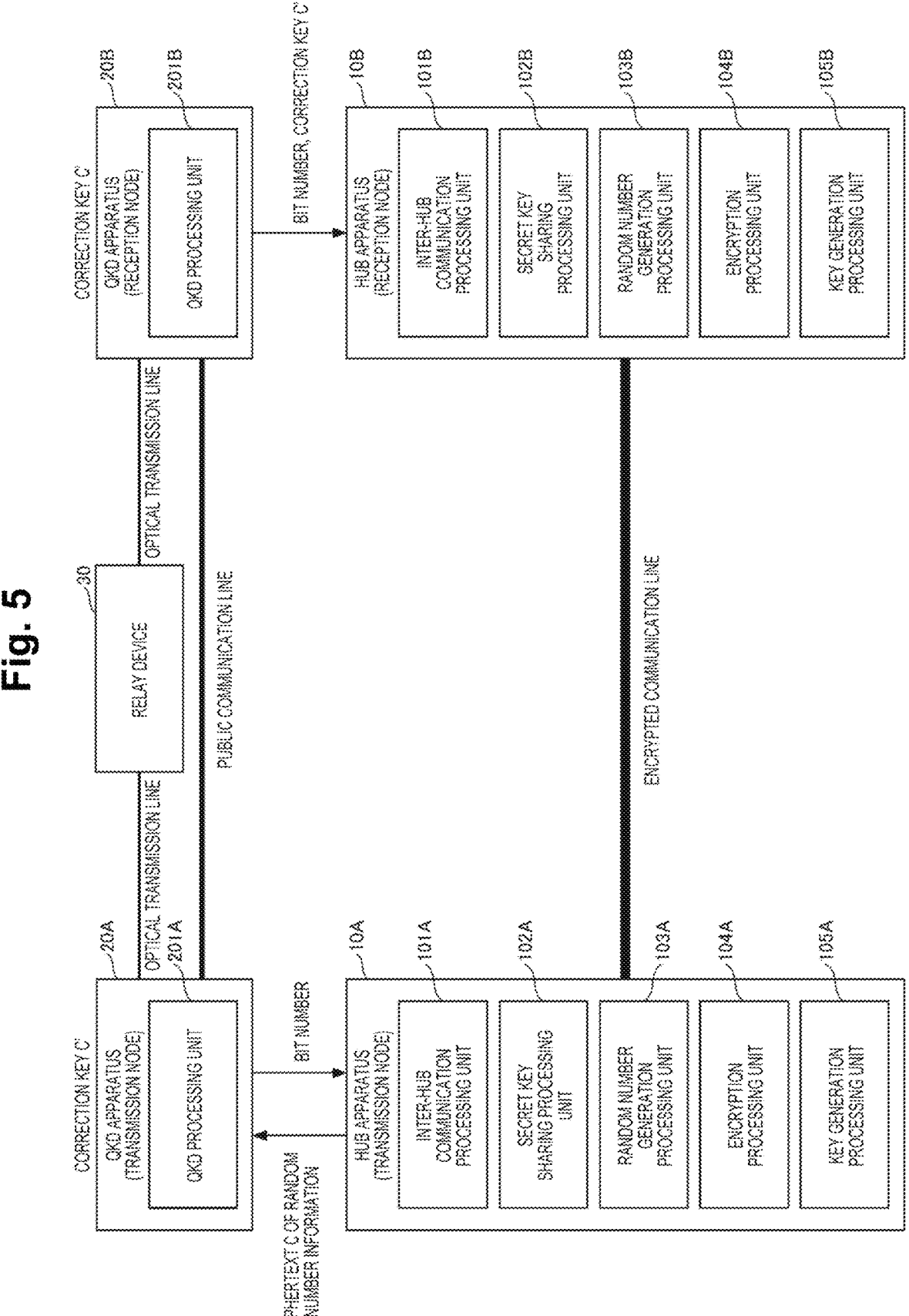
FIG. 5 is a diagram illustrating an application example of the overall configuration of the key exchange system according to the present embodiment.
Figure 6:
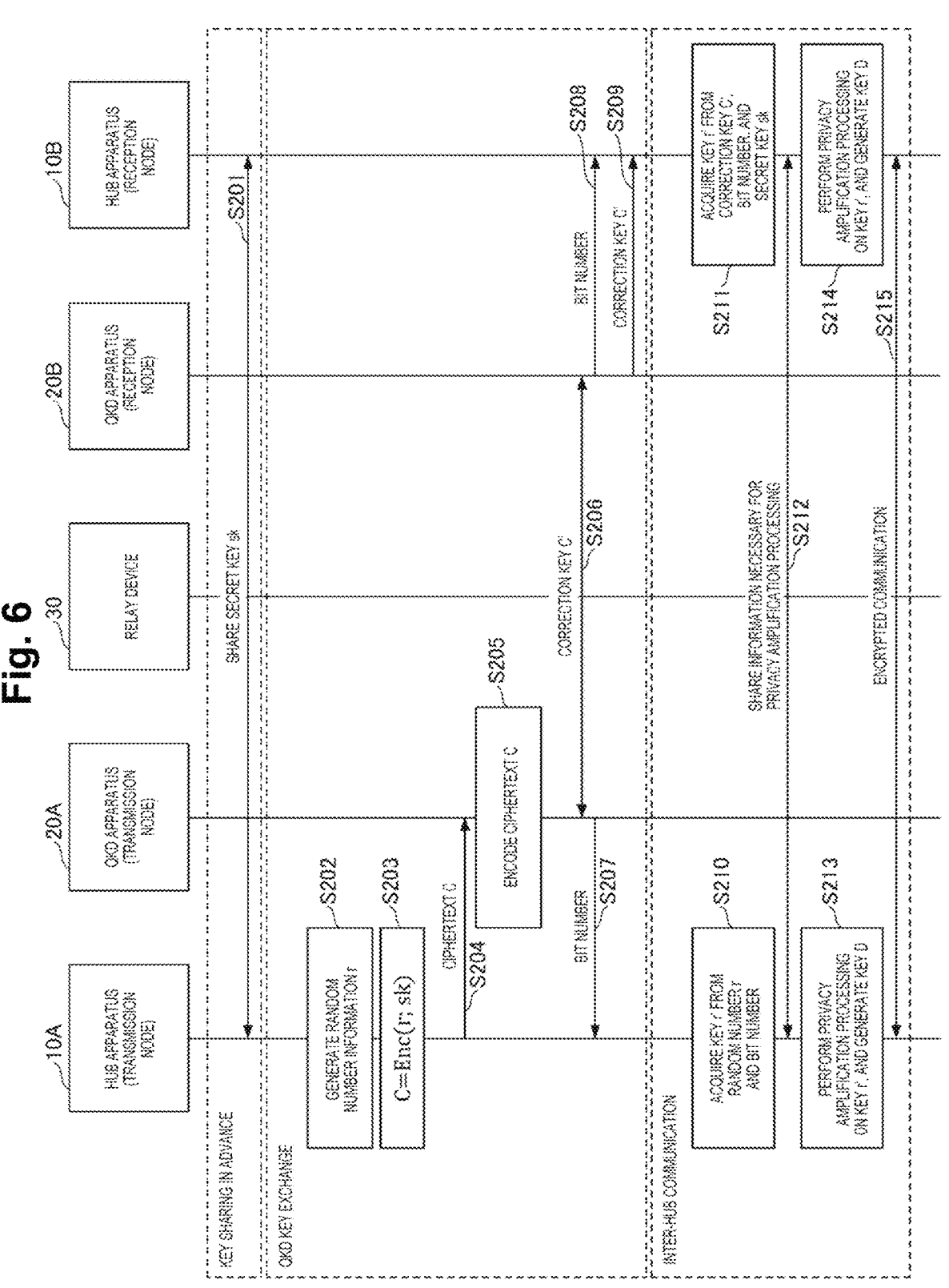
FIG. 6 is a sequence diagram illustrating an application example of processing executed by the key exchange system according to the present embodiment.

As illustrated in FIG. 5, in the key exchange system in the application example, there is the relay apparatus 30 between the hub apparatus 10A and the hub apparatus 10B. The relay apparatus 30 is connected to the hub apparatus 10A via an optical transmission line, and is also connected to the hub apparatus 10B via an optical transmission line.
Processing Executed by Key Exchange System in Application Example Processing executed by the key exchange system in the application example will be described with reference to FIG. 6. In the present application example, only the processing of steps S205 and S206 in FIG. 6 is different from the sequence diagram described in FIG. 4. Thus, only the processing of steps S205 and S206 will be described below.

The QKD processing unit 201A of the QKD apparatus 20A encodes the ciphertext C (for example, sets a coding rate according to a previous error rate (bit error rate) and then performs encoding) (step S205), and executes the QKD protocol (including error correction and the like) with the QKD processing unit 201B of the QKD apparatus 20B via the relay apparatus 30 to generate and share a correction key C' (step S206). Note that, regarding encoding, similarly to the existing BB84 scheme or the like, it is sufficient to encode each bit of a bit string representing the ciphertext C into the polarization (or phase) of a photon. In addition, similarly to the existing BB84 scheme or the like, the QKD processing unit 201A of the QKD apparatus 20A and the QKD processing unit 201B of the QKD apparatus 20B only need to obtain a sifted key by basis reconciliation, then calculate the bit error rate and evaluate the presence or absence of eavesdropping, and in a case where it is evaluated that there is no eavesdropping, perform error correction to generate and share a correction key C'. However, for the error correction, a method capable of setting a coding rate (for example, a low density parity check code (LDPC or the like)) is used.
<Hardware Configuration of Each Device>

Figure 7:
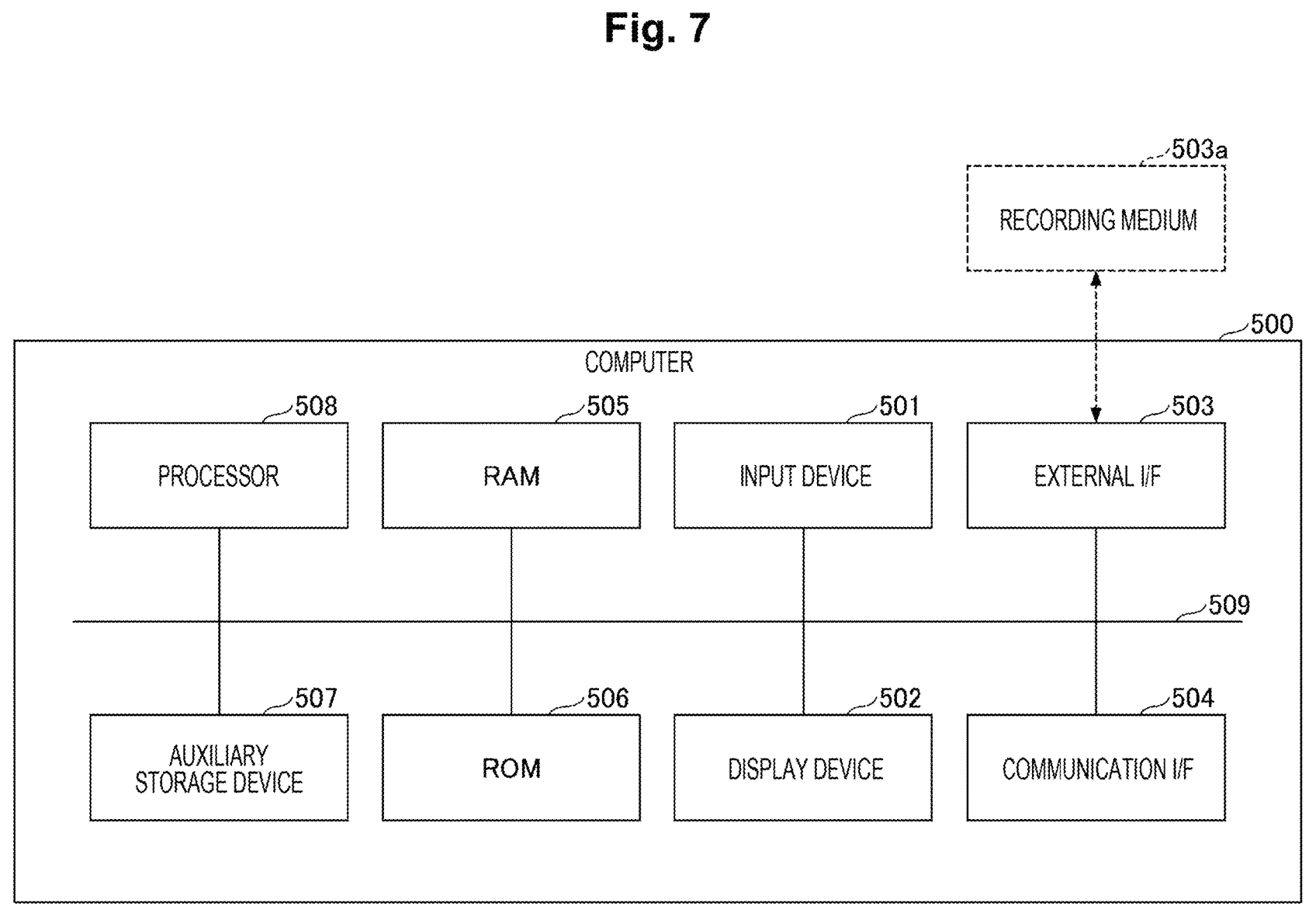

A hub apparatus 10, a QKD apparatus 20, and a relay apparatus 30 can be implemented by, for example, a hardware configuration of a computer 500 illustrated in FIG. 7.

The computer 500 illustrated in FIG. 7 includes an input device 501, a display device 502, an external I/F 503, a communication I/F 504, a random access memory (RAM) 505, a read only memory (ROM) 506, an auxiliary storage device 507, and a processor 508. These pieces of hardware are communicably connected to each other via a bus 509.

The input device 501 is, for example, a keyboard, a mouse, a touch panel, a physical button, or the like. The display device 502 is, for example, a display, a display panel, or the like. Note that the computer 500 may not include at least one of the input device 501 and the display device 502, for example.

The external I/F 503 is an interface with an external device such as a recording medium 503a. The computer 500 can read or write the recording medium 503a via the external I/F 503. Examples of the recording medium 503a include a flexible disk, a compact disc (CD), a digital versatile disk (DVD), a secure digital memory card (SD memory card), a universal serial bus (USB) memory card, and the like.

The communication I/F 504 is an interface for connecting the computer 500 to a communication network. The RAM 505 is a volatile semiconductor memory (storage device) that temporarily holds programs and data. The ROM 506 is a non-volatile semiconductor memory (storage device) capable of holding programs and data even when the power is turned off. The auxiliary storage device 507 is, for example, a storage device such as a hard disk drive (HDD), a solid state drive (SSD), or a flash memory. The processor 508 is, for example, an arithmetic device such as a CPU.

The hub apparatus 10, the QKD apparatus 20, and the relay apparatus 30 according to the present embodiment have, for example, the hardware configuration of the computer 500 illustrated in FIG. 7, thereby being able to implement the above-described various types of processing. Note that the hardware configuration of the computer 500 illustrated in FIG. 7 is an example, and the hardware configuration of the computer 500 is not limited thereto. For example, the computer 500 may include a plurality of auxiliary storage devices 507 and a plurality of processors 508, may not include a part of the illustrated hardware, or may include various types of hardware other than the illustrated hardware.
<Conclusion>

As described above, in the key exchange system according to the present embodiment, the secret key sk is shared between the hub apparatuses 10 and the random number information is encrypted by using the secret key sk, and then the QKD protocol (including error correction and the like) is executed between the QKD apparatuses 20 by using the encrypted random number information. As a result, each of the hub apparatuses 10 can obtain the encryption key D (QKD key) from the correction key C' obtained by the error correction. At this time, since the QKD apparatuses 20 generate the correction key C' from the encrypted random number information, it is possible to conceal the random number information (key information) from the QKD apparatuses 20. Therefore, for example, even in a case where the QKD apparatuses 20 are unreliable, the security of the entire system can be improved.
<Sharing of Secret Key sk>

In the above embodiment, the method of sharing the secret key sk between the hub apparatus 10A and the hub apparatus 10B is not particularly limited, and an existing key encapsulation mechanism (KEM) or the like may be used; however, for example, by using a KEM of post-quantum cryptography such as NTRU that is a type of lattice-based cryptography, it is possible to perform key sharing for a quantum computer.

The present invention is not limited to the above-mentioned specifically disclosed embodiments, and various modifications and changes, combinations with known technologies, and the like can be made without departing from the scope of the claims.

REFERENCE SIGNS LIST

10 Hub apparatus
20 QKD apparatus

30 Relay apparatus
101 Inter-hub communication processing unit
102 Secret key sharing processing unit
103 Random number generation processing unit
104 Encryption processing unit
105 Key generation processing unit
201 QKD processing unit
500 Computer
501 Input device
502 Display device
503 External I/F
503*a* Recording medium
504 Communication I/F
505 RAM
506 ROM
507 Auxiliary storage device
508 Processor
509 Bus

The invention claimed is:

1. A key exchange system comprising:
a plurality of quantum key distribution (QKD) apparatuses that executes a quantum key distribution protocol including at least error correction; and
a plurality of hub apparatuses that performs encrypted communication with each other, wherein
each of the hub apparatuses includes
  a first processor, and
  a first memory storing first program instructions that cause the first processor to
  generate an encryption key for performing the encrypted communication with another hub apparatus based on information received from a corresponding one of the QKD apparatuses, and
each of the QKD apparatuses includes
  a second processor, and
  a second memory storing second program instructions that cause the second processor to
  execute the quantum key distribution protocol with another QKD apparatus and generate a correction key from a ciphertext of random number information, and
  transmit information representing a result of basis reconciliation in the quantum key distribution protocol to a corresponding one of the hub apparatuses,
wherein for a hub apparatus configured as a hub on a data transmission side among the plurality of hub apparatuses, the first program instructions further cause the first processor to:
share a secret key with a hub apparatus existing in a hub on a data reception side;
generate the random number information that is a random bit string having a predetermined length;
generate the ciphertext by encrypting the random number information by using the secret key; and
transmit the ciphertext to a QKD apparatus existing in the hub on the data transmission side; and
wherein the first processor of the hub apparatus existing in the hub on the data transmission side generates the encryption key based on the result of the basis reconciliation and the random number information.

2. The key exchange system according to claim 1, wherein
in the QKD apparatus existing in the hub on the data reception side among the plurality of QKD apparatuses, the second program instructions cause the second processor to transmit the information representing the result of the basis reconciliation and the correction key to the hub apparatus existing in the hub on the data reception side, and
in the hub apparatus existing in the hub on the data reception side, the first program instructions cause the first processor to generate the encryption key based on the result of the basis reconciliation, the correction key, and the secret key.

3. The key exchange system according to claim 1, wherein
the secret key is a key of a stream encryption scheme, and
the first program instructions cause the first processor to
  share the secret key with the hub apparatus existing in the hub on the data reception side by using a key encapsulation mechanism based on post-quantum cryptography.

4. A hub apparatus in a key exchange system, the key exchange system including: a plurality of QKD apparatuses that executes a quantum key distribution protocol including at least error correction; and a plurality of hub apparatuses that performs encrypted communication with each other, the hub apparatus comprising:
a processor; and
a memory storing program instructions that cause the processor, when the hub apparatus is configured as a hub on a data transmission side, to:
  share a secret key with another hub apparatus existing in a hub on a data reception side;
  generate random number information that is a random bit string having a predetermined length;
  generate a ciphertext by encrypting the random number information using the secret key;
  transmit the ciphertext to a QKD apparatus existing in the hub on the data transmission side; and
  receive information representing a result of basis reconciliation in the quantum key distribution protocol from the QKD apparatus; and
  generate an encryption key for performing the encrypted communication with said another hub apparatus based on the result of the basis reconciliation and the random number information.

5. A non-transitory computer-readable recording medium storing a program for causing a computer to function as the hub apparatus of claim 4.

6. A quantum key distribution (QKD) apparatus in a key exchange system, the key exchange system including: a plurality of QKD apparatuses that executes a quantum key distribution protocol including at least error correction; and a plurality of hub apparatuses that performs encrypted communication with each other, the QKD apparatus comprising:
a processor; and
a memory storing program instructions that cause the processor to:
  execute the quantum key distribution protocol with another QKD apparatus;
  receive a ciphertext corresponding to random number information generated by a hub apparatus configured as a hub on a data transmission side;
  generate a correction key based on the ciphertext; and
  transmit information representing a result of basis reconciliation in the quantum key distribution protocol to a hub apparatus existing in a hub on a data transmission side,
wherein
the correction key corresponds to the ciphertext corresponding to the random number information, and the result of basis reconciliation is transmitted to the hub apparatus configured as the hub on the data transmission side, the hub apparatus being configured to generate an encryption key based on the result of the basis reconciliation and the random number information.

7. A non-transitory computer-readable recording medium storing a program for causing a computer to function as the QKD apparatus of claim 6.

* * * * *